(12) United States Patent
Onizuka

(10) Patent No.: US 10,105,799 B2
(45) Date of Patent: Oct. 23, 2018

(54) HUB UNIT MANUFACTURING APPARATUS

(71) Applicant: JTEKT CORPORATION, Osaka-shi, Osaka (JP)

(72) Inventor: Takaaki Onizuka, Kashiwara (JP)

(73) Assignee: JTEKT CORPORATION, Osaka-shi (JP)

(*) Notice: Subject to any disclaimer, the term of this patent is extended or adjusted under 35 U.S.C. 154(b) by 424 days.

(21) Appl. No.: 14/847,516

(22) Filed: Sep. 8, 2015

(65) Prior Publication Data
US 2016/0074928 A1 Mar. 17, 2016

(30) Foreign Application Priority Data
Sep. 15, 2014 (JP) .................. 2014-187166

(51) Int. Cl.
*B23P 11/00* (2006.01)
*B60B 27/00* (2006.01)

(52) U.S. Cl.
CPC ........ *B23P 11/005* (2013.01); *B60B 27/0031* (2013.01); *B60B 27/0084* (2013.01); *B60B 2310/206* (2013.01); *B60B 2310/213* (2013.01); *Y10T 29/49533* (2015.01); *Y10T 29/49535* (2015.01); *Y10T 29/49536* (2015.01); *Y10T 29/49833* (2015.01); *Y10T 29/49845* (2015.01)

(58) Field of Classification Search
CPC .............. B23P 11/005; B60B 27/0084; B60B 2310/213; B60B 2310/206; Y10T 29/49533; Y10T 29/49535; Y10T 29/49536
USPC .................................. 29/724, 725, 802, 898
See application file for complete search history.

(56) References Cited

FOREIGN PATENT DOCUMENTS

| CN | 104036072 A | 9/2014 |
|----|-------------|--------|
| JP | 2000-038005 A | 2/2000 |

OTHER PUBLICATIONS

May 21, 2018 Office Action issued in Chinese Patent Application No. 201510582689.8.

*Primary Examiner* — Bayan Salone
(74) *Attorney, Agent, or Firm* — Oliff PLC

(57) ABSTRACT

An axial section of a continuous portion where an outer peripheral surface of a spindle portion of a main spindle in which a punch is installed is continuous with an outer peripheral surface of a punch holder is formed of a first circular arc joined to the outer peripheral surface of the spindle portion and a second circular arc joined to the outer peripheral surface of the punch holder. The first circular arc and the second circular arc are in contact with each other. The second circular arc is smaller than the first circular arc in curvature radius.

3 Claims, 7 Drawing Sheets

US 10,105,799 B2

HUB UNIT MANUFACTURING APPARATUS

INCORPORATION BY REFERENCE

The disclosure of Japanese Patent Application No. 2014-187166 filed on Sep. 15, 2014 including the specification, drawings and abstract, is incorporated herein by reference in its entirety.

BACKGROUND OF THE INVENTION

1. Field of the Invention

The present invention relates to a manufacturing apparatus that manufactures a hub unit and that is used in a process of clinching a shaft end of an inner shaft after an inner ring member is press-fitted over the shaft end of the inner shaft. In particular, the present invention relates to a manufacturing apparatus in which a main spindle supporting a clinching punch has an improved strength.

2. Description of Related Art

A hub unit is used as a bearing apparatus that supports wheels of a vehicle such that the wheels are rotatable. In an inner shaft of the hub unit, an inner ring member is assembled into a shaft end of a hub shaft. During a process of manufacturing a hub unit, the shaft end of the hub shaft is clinched so that the assembled inner ring member is prevented from slipping out from the shaft end. For example, an oscillating clinching apparatus in Japanese Patent Application Publication No. 2000-38005 (JP 2000-38005 A) is used for this clinching process.

FIG. 8 schematically illustrates a clinching method using an oscillating clinching apparatus 100. A hub shaft 101 has a cylindrical shaft end portion 106 at a shaft end thereof. An inner ring member 102 is press-fitted over the shaft end portion 106. In this case, a part of the shaft end portion 106 protrudes from an end surface of an inner ring member 102. In the oscillating clinching apparatus 100, a punch 104 is pressed against the protruding part to push the protruding part outward in a radial direction. In FIG. 8, the shape of the shaft end portion 106 that has not been plastically deformed is depicted by a long dashed double-short dashed line.

The punch 104 is installed at a distal end of a main spindle 105. The main spindle 105 is inclined at a predetermined angle θ to an axis of the oscillating clinching apparatus. Thus, the punch 104 contacts the shaft end portion 106 at one point on a circumference of the shaft end portion 106. Pressing the punch 104 against the shaft end portion 106 causes the contact portion to be plastically deformed outward in the radial direction. When the main spindle 105 is lowered toward the hub shaft while being pivoted around the axis of the hub shaft 101, the shaft end portion 106 is plastically deformed outward in the radial direction all over a circumference thereof. In this manner, the oscillating clinching apparatus 100 partly plastically deforms the shaft end portion 106 to allow the shaft end portion 106 to be machined with a relatively low clinching load compared to a method of simultaneously plastically deforming the entire circumference of the shaft end portion 106.

Thus, a clinching portion 103 is formed at the shaft end of the hub shaft 101. The clinching portion 103 constrains movement of the inner ring member 102 in an axial direction to prevent the inner ring member 102 from slipping out.

The punch 104 is changed to a different punch as needed according to the size of the hub unit 107. Thus, a punch holder 108 to which the punch 104 is attached is formed at the spindle end of the main spindle 105. The punch holder 108 has outside dimensions equivalent to outside dimensions of the punch 104, and has a relatively large diameter. On the other hand, a spindle portion 109 corresponding to the whole main spindle 105 except for the punch holder 108 supports only a relatively low clinching load, and needs only a small diameter dimension. An example of the shape of the spindle portion 109 with a reduced diameter dimension is depicted in FIG. 8 by a dashed line. Reducing the diameter dimension of the spindle portion 109 allows the oscillating clinching apparatus 100 to be made compact. As described above, in the main spindle 105 of the oscillating clinching apparatus 100, the spindle portion 109 is shaped like a cylinder with a small diameter and provided with the punch holder 108 with a large diameter at the spindle end of the spindle portion 109.

However, the above-described shape involves a "joint portion" K formed at a portion of the main spindle 105 where the punch holder 108 and the spindle portion 109 are joined together. When the oscillating clinching apparatus 100 with the main spindle 105 assembled therein is used as a mass production facility to manufacture a large number of hub units, the "joint portion" K may disadvantageously be broken relatively prematurely.

SUMMARY OF THE INVENTION

An object of the present invention is to allow, for a hub unit manufacturing apparatus used in a process of clinching a shaft end of a hub shaft, avoiding premature breakage of a main spindle that has, at a spindle end thereof, a punch holder having a diameter larger than the diameter of a spindle portion, and to provide the hub unit manufacturing apparatus with improved durability.

According to an aspect of the present invention, a hub unit manufacturing apparatus that, after an inner ring member is installed in a hub shaft of a hub unit, causes a punch to contact with a shaft end portion of the hub shaft to push and expand the shaft end portion while plastically deforming the shaft end portion so that the inner ring member is constrained by the hub shaft. A main spindle in which the punch is installed has a cylindrical spindle portion and a punch holder formed integrally with the spindle portion and having a larger diameter than the spindle portion. An axial section of a continuous portion where an outer peripheral surface of the spindle portion is joined to an outer peripheral surface of the punch holder is formed of a first circular arc joined to the outer peripheral surface of the spindle portion and a second circular arc joined to the outer peripheral surface of the punch holder. The first circular arc and the second circular arc are in contact with each other, and the second circular arc is smaller than the first circular arc in curvature radius.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 2:
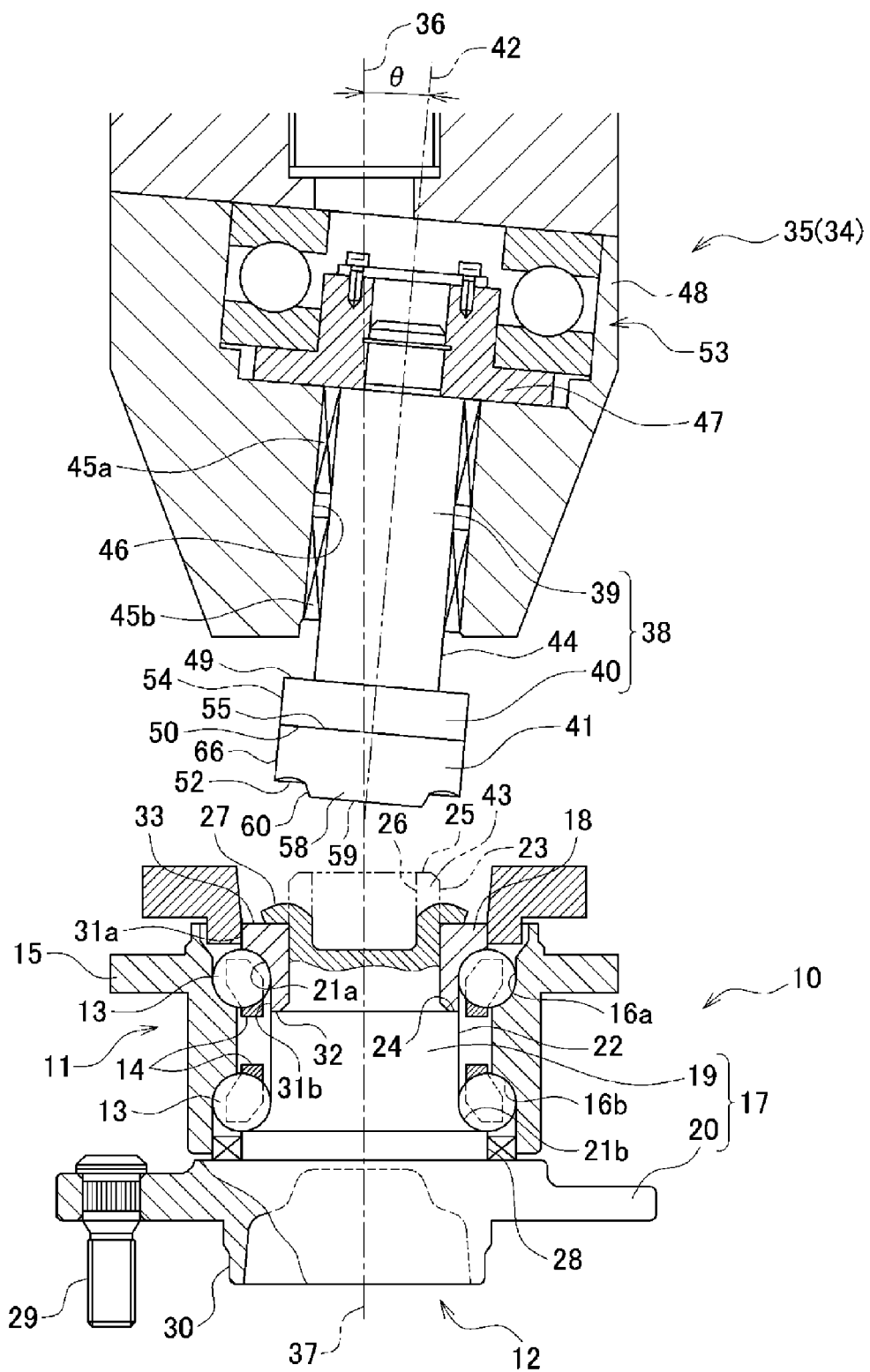
FIG. 2 is a diagram illustrating arrangement of a hub unit and a oscillating clinching apparatus when clinching is performed using a hub unit manufacturing apparatus according to the present invention.

Using FIG. 2, a description will be given of a structure of an oscillating clinching apparatus 34 that is an embodiment of a hub unit manufacturing apparatus according to the present invention and a clinching method using the oscillating clinching apparatus 34. An up-down direction in FIG. 2 is a vertical direction. FIG. 2 illustrates that the oscillating clinching apparatus 34 is disposed above a hub unit 10 in the vertical direction and that a shaft end of a hub shaft is clinched. To facilitate understanding of a clinching state, FIG. 2 depicts only a head portion 35 of the oscillating clinching apparatus 34. Furthermore, during actual clinching, a lower end portion of the head portion 35 contacts an upper end portion of the hub unit 10. However, to avoid complicating the figure, the head portion 35 and the hub unit 10 are illustrated separately from each other in the up-down direction.

First, the hub unit 10 will be described. When the hub unit 10 is attached to a vehicle, the lower side of FIG. 2 corresponds to the outer side of the vehicle. Thus, the lower side of FIG. 2 is hereinafter referred to as an outer side, and the upper side of FIG. 2 is hereinafter referred to as an inner side. In the following description of the hub unit 10, an "axial direction" refers to the direction of an axis 37 of the hub unit 10. A direction orthogonal to the axial direction is hereinafter referred to as a "radial direction".

The hub unit 10 has an outer ring 11, an inner ring 12, balls 13, 13, and cages 14, 14.

The outer ring 11 is formed of carbon steel such as S55C. A flange portion 15 is formed integrally with the outer ring 11 on an outer periphery thereof. Two rows of outer raceway surfaces 16a and 16b are formed on an inner periphery of the outer ring 11. An axial section of each of the outer raceway surfaces 16a and 16b is shaped like a circular arc.

The inner ring 12 includes a hub shaft 17 and an inner ring member 18 press-fitted over an inner-side end of the hub shaft 17. The hub shaft 17 is formed of carbon steel such as S55C. In the hub shaft 17, a shaft portion 19 and a flange portion 20 are integrally formed.

An angular inner raceway surface 21b is formed all over an outer periphery of the shaft portion 19. An axial section of the inner raceway surface 21b is shaped like a circular arc. A cylindrical surface 22 is provided on an inner-side portion of the shaft portion 19 with respect to the inner raceway surface 21b. The cylindrical surface 22 is shaped like a cylinder coaxial with the inner raceway surface 21b and has an outside diameter dimension substantially equal to a minimum diameter of the inner raceway surface 21b. A shoulder 28 is formed on an outer-side portion of the shaft portion 19 with respect to the inner raceway surface 21b. The shoulder 28 is shaped like a cylinder formed coaxially with the inner raceway surface 21b.

An inner ring fitting surface 23 is formed on an outer periphery of an inner-side shaft end of the shaft portion 19. The inner ring fitting surface 23 is shaped like a cylinder coaxial with the cylindrical surface 22 and has a smaller outside diameter dimension than the cylindrical surface 22. The cylindrical surface 22 is continuous with the inner ring fitting surface 23 via a flat side surface 24 extending in the radial direction. The inner ring fitting surface 23 is larger than the inner ring member 18 in axial length. Thus, when the inner ring member 18 is fitted over the inner ring fitting surface 23, a part of the inner ring fitting surface 23 protrudes from an end surface of the inner ring member 18.

An end surface 25 that is a flat surface extending in the radial direction is formed on an inner-side portion of the inner ring fitting surface 23. A hole 26 coaxial with the inner ring fitting surface 23 is formed in the end surface 25. The depth of the hole 26 from the end surface 25 is larger than the length from the end surface 25 to an inner-side end surface of the inner ring member 18 when the inner ring member 18 is fitted over the inner ring fitting surface 23. Thus, a cylindrical portion 43 protruding in the axial direction with respect to the inner ring member 18 is formed at the inner-side shaft end of the shaft portion 19. When clinched, the cylindrical portion 43 is plastically deformed into a clinched portion 27. In FIG. 2, the shape of the cylindrical portion 43 that has not been clinched is depicted by a long dashed double-short dashed line.

The flange portion 20 is formed like a disc and continuous with an outer-side portion of the shaft portion 19. In the flange portion 20, a plurality of bolts 29 penetrating the flange portion 20 in the axial direction is provided so that a wheel is attached. A cylindrical wheel spigot joint 30 coaxial with the flange portion 20 is formed on an outer-side surface of the flange portion 20.

The inner ring member 18 is formed of bearing steel. An inner raceway surface 21a is formed on an outer periphery of the inner ring member 18. Shoulder 31a is formed on one side of the inner raceway surface 21a in the axial direction and shoulder 31b is formed on the other side of the inner raceway surface 21a in the axial direction. An axial section of the inner raceway surface 21a is shaped like a circular arc. Each of the shoulders 31a and 31b is a cylindrical surface coaxial with the inner raceway surface 21a. The axially inner-side shoulder 31a is larger than the axially outer-side shoulder 31b in outside diameter dimension. An inner periphery of the inner ring member 18 is a cylindrical surface coaxial with the inner raceway surface 21a. A small end surface 32 is formed at an end of the inner ring member 18 in the axial direction. A large end surface 33 is formed at the other side of the inner ring member 18 in the axial direction. The small end surface 32 and the large end surface 33 are flat surfaces extending in the radial direction and are parallel to each other.

The inner ring member 18 is fitted over the inner ring fitting surface 23 such that the small end surface 32 faces the outer side, and is press-fitted until the small end surface 32 comes into contact with the side surface 24. When the inner ring member 18 is fitted over the inner ring fitting surface 23, the balls 13 are assembled between the outer raceway surface 16a and the inner raceway surface 21a that are opposed to each other in the radial direction and between the outer raceway surface 16b and inner raceway surface 21b that are opposed to each other in the radial direction. The balls 13 are held by the cages 14 at predetermined intervals along raceway surfaces. Thus, the hub shaft 17 and the outer ring 11 are coaxially assembled.

Next, the oscillating clinching apparatus 34 described below is used to plastically deform the cylindrical portion 43 outward in the radial direction to form the clinched portion 27. The clinched portion 27 prevents the inner ring member 18 from slipping out and allows the hub unit 10 to be assembled.

Now, also with reference to FIG. 2, the structure of the head portion 35 of the oscillating clinching apparatus 34 will be described. The head portion 35 is disposed such that an axis (hereinafter referred to as a "head axis") 36 thereof is coaxial with an axis 37 of the hub unit (hereinafter referred to as a "hub axis"). Although not depicted in the drawings, the head portion 35 is rotatably supported by a rolling bearing and can rotate around the head axis 36. A turning force around the head axis 36 is applied by, for example, an electric motor not depicted in the drawings. The head portion 35 is supported by a linear bearing not depicted in the drawings so as to be movable in the vertical direction. The movement in the vertical direction is performed by a ball screw, a hydraulic cylinder, and the like that are not depicted in the drawings.

A main spindle 38 is assembled in the head portion 35. The main spindle 38 is rotatably supported around an axis 42 (hereinafter referred to as a "main spindle axis 42") inclined at a predetermined angle θ to the head axis 36. The main spindle axis 42 crosses the head axis 36 at a position substantially in a clinching portion 52 at a spindle end of the main spindle 38.

The structure of the main spindle 38 will be described in detail. The main spindle 38 is formed of carbon steel and includes a spindle portion 39 and a punch holder 40 that are formed integrally with each other. In the following description of the main spindle 38 and the punch holder 40, the "axial direction" refers to the direction of the main spindle axis 42, and the "radial direction" refers to a direction orthogonal to the main spindle axis 42.

The spindle portion 39 is shaped like a cylinder. An outer peripheral surface 44 of the spindle portion 39 is a cylindrical surface coaxial with the main spindle axis 42 and is ground. Needle roller bearings are assembled in rows between the outer peripheral surface 44 and a housing inner peripheral surface 46 of the head portion 35. A needle roller bearing 45b is assembled in a portion closer to the punch holder. A needle roller bearing 45a is assembled in a portion away from the punch holder in the axial direction. Each of the needle roller bearings 45a and 45b is of a cage and roller type in which rollers and a cage are combined together. The outer peripheral surface 44 and the housing inner peripheral surface 46 are each a raceway surface for the needle roller bearings 45a and 45b. A thrust pedestal 47 is assembled at an upper spindle end of the main spindle 38 in the vertical direction. A thrust ball bearing 53 is assembled between the thrust pedestal 47 and a housing 48. Thus, the main spindle 38 is supported so as to be rotatable and to be immovable in the axial direction, with respect to the housing 48.

The punch holder 40 is shaped like a cylinder. An outer peripheral surface of the punch holder 40 is formed of a cylindrical surface 54, a side surface 49, and a punch installation surface 50. The cylindrical surface 54 is shaped like a cylinder coaxial with the main spindle axis 42 and is larger than the spindle portion 39 in diameter dimension. The side surface 49 is formed of a flat surface orthogonal to the main spindle axis 42 and joins one end of the cylindrical surface 54 closer to the spindle portion 39 to the outer peripheral surface 44 of the spindle portion 39. The punch installation surface 50 is a surface to which a punch 41 is attached. The punch installation surface 50 is formed of a flat surface orthogonal to the main spindle axis 42 and is joined to the other end of the cylindrical surface 54 in the axial direction.

The punch 41 is shaped generally like a cylinder and fixed to the punch installation surface 50 by a bolt (not depicted in the drawings) installed coaxially with the main spindle axis 42. The punch 41 is formed of a material such as high-speed tool steel. A cylindrical surface 66 coaxial with the main spindle axis 42 is formed on an outer periphery of the punch 41. A flat surface 55 orthogonal to the main spindle axis 42 is formed on one side of the punch 41 in the axial direction. A protruding portion 58 protruding coaxially with the main spindle axis 42 in the axial direction is formed on the other side of the punch 41 in the axial direction. The protruding portion 58 is formed of a flat end surface 59 and a tapered surface 60. The end surface 59 is orthogonal to the main spindle axis 42. The diameter of the tapered surface 60 increases as the tapered surface 60 extends from an outer peripheral edge of the end surface 59 in the axial direction. A ring-like clinching portion 52 is formed in a radially outer portion of the protruding portion 58. The clinching portion 52 is shaped generally like a circular arc and has an axial section that is recessed in the axial direction. A portion of the circular arc closer to the main spindle axis 42 is joined to the tapered surface 60.

Figure 1:
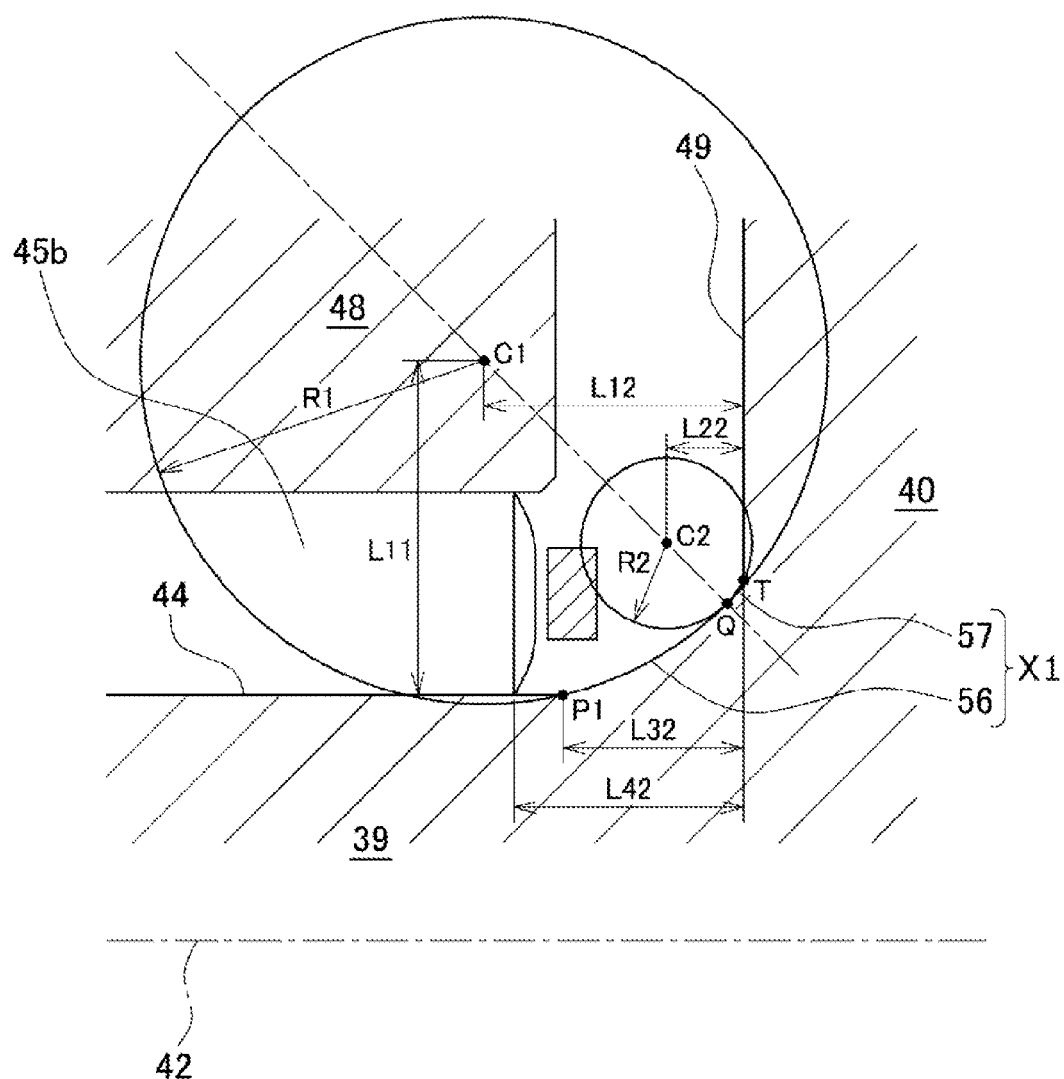
FIG. 1 is an enlarged view of a main part of a main spindle according to a first embodiment of the present invention.

Now, the shape of a portion of the main spindle 38 where the outer peripheral surface 44 of the spindle portion 39 and the side surface 49 of the punch holder 40 are joined together will be described in detail with reference to FIG. 1. FIG. 1 is an enlarged view of a main part of the main spindle 38 in axial section.

An axial section of the portion where the outer peripheral surface 44 and the side surface 49 are joined together is shaped by a first circular arc 56 joined to the outer peripheral surface 44 and a second circular arc 57 joined to the side surface 49. An area that joins the outer peripheral surface 44 and the side surface 49 together is hereinafter referred to as a "continuous portion". In a first embodiment, an area formed of the first circular arc 56 and the second circular arc 57 is referred to as a continuous portion X1.

The first circular arc 56 is shaped to protrude inward in the radial direction. A curvature center C1 of the first circular arc 56 is located outward of the outer peripheral surface 44 in the radial direction and closer to the outer peripheral surface 44 than to the side surface 49. The first circular arc 56 intersects or contacts the outer peripheral surface 44, and an extension of the first circular arc 56 intersects the side surface 49. That is, when the curvature radius of the first circular arc 56 is represented as R1, at the position of the curvature center C1 of the first circular arc 56, a radial dimension L11 from the outer peripheral surface 44 is smaller than or equivalent to R1 (L11≤R1), and an axial dimension L12 from the side surface 49 is smaller than R1 (L12<R1). A point where the first circular arc 56 crosses the outer peripheral surface 44 is represented as a point P1.

The second circular arc 57 is shaped to protrude inward in the radial direction. A curvature center C2 of the second circular arc 57 is located radially outward of the first circular arc 56 and closer to the outer peripheral surface 44 than to the side surface 49. A curvature radius R2 of the second circular arc 57 is smaller than a curvature radius R1 of the first circular arc 56. The second circular arc 57 intersects or contacts the side surface 49, and the first circular arc 56 and the second circular arc 57 contact each other. A point where the second circular arc 57 crosses the side surface 49 is represented as a point T, and a point where the first circular arc 56 crosses the second circular arc 57 is represented as a point Q. The position of the curvature center C2 of the second circular arc 57 is on a straight line connecting the curvature center C1 of the first circular arc 56 and the point Q together, and an axial dimension L22 from the side surface 49 is smaller than or equivalent to R2 (L22≤R2).

The axial position of the point P1 does not overlap the needle roller bearing 45b. If the axial position of the point P1 is set to overlap the needle roller bearing 45b, the diameter dimension increases gradually in an area from the point P1 to the point Q. Consequently, the raceway surface on the main spindle 38 for the needle roller bearing 45 is not shaped like a cylinder. Thus, in this tentative case, the roller may be skewed, or the roller locally intensely impacts the raceway surface, disadvantageously damaging the raceway surface. Thus, in the first embodiment, an axial dimension L32 between the point P1 and the side surface 49 is smaller than an axial dimension L42 between the raceway surface for the needle roller bearing 45b and the side surface 49. The curvature radius R1 and curvature center C1 of the first circular arc 56 may be selected as needed. This allows the axial position of the point P1 to be set so as not to overlap the raceway surface for the needle roller bearing 45b.

Figure 4:
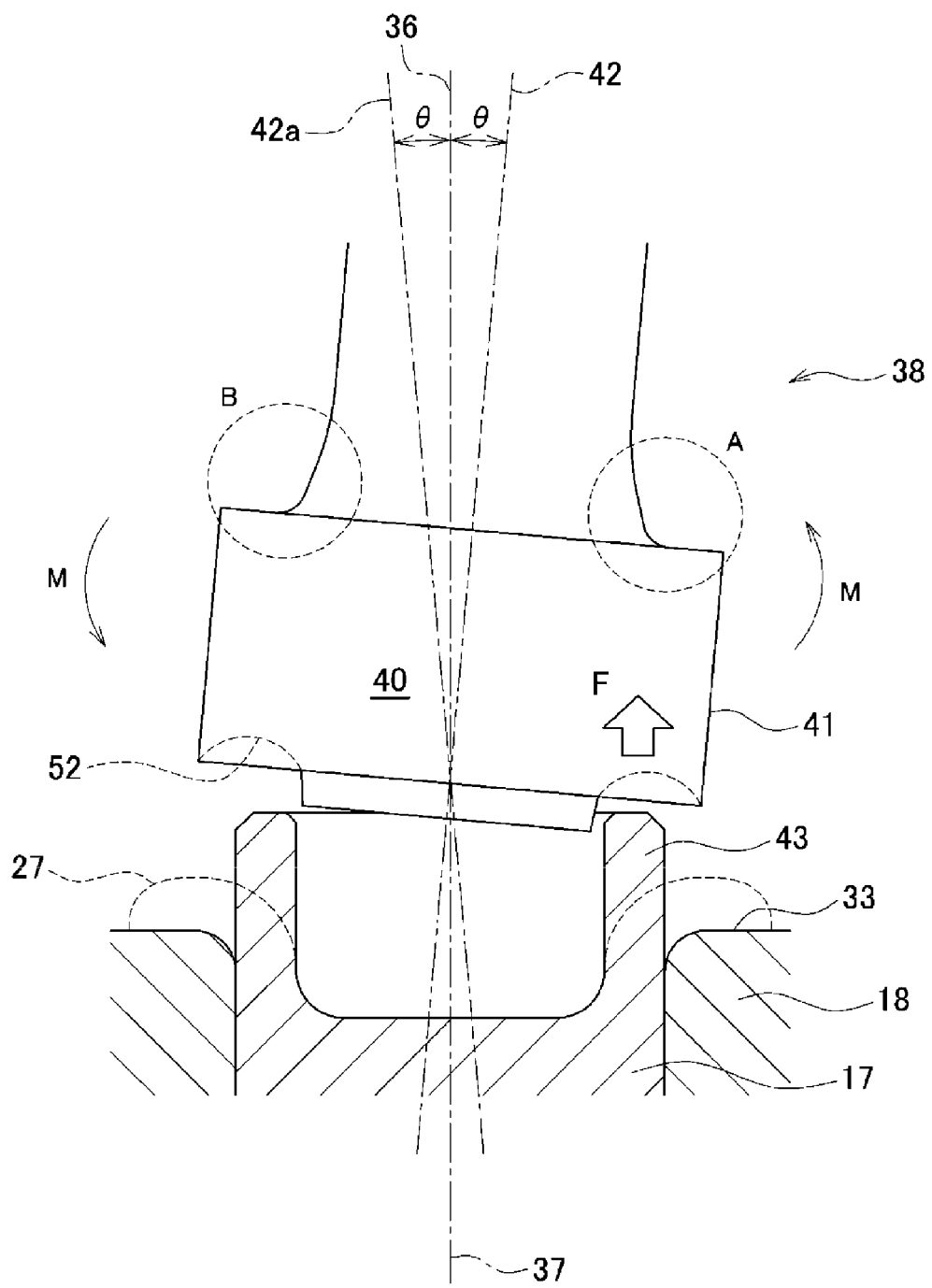
FIG. 4 is a diagram illustrating generation of a load during clinching.

With reference to FIG. 4, a machining method will be described in which the cylindrical portion 43 of the hub shaft 17 is clinched using the oscillating clinching apparatus 34. A description will be given with reference to FIG. 2 as needed. The head portion 35 is disposed above the hub shaft 17 in the vertical direction (see FIG. 2). The head axis 36 and the hub axis 37 are disposed coaxially with each other. For clinching, the head portion 35 is lowered, and the punch 41 is pressed against the cylindrical portion 43. At this time, the head portion 35 rotates around the head axis 36, and thus, the main spindle 38 pivots around the head axis 36.

The main spindle 38 is inclined at the predetermined angle θ to the head axis 36. Thus, the cylindrical portion 43 comes into contact with the punch 41 at one point on a circumference of the cylindrical portion 43. In this state, the head portion 35 is lowered, and then, at the contact point, the cylindrical portion 43 is pushed outward in the radial direction along the circular arc surface of the clinching portion 52.

As the main spindle 38 pivots, the position of the point where the cylindrical portion 43 contacts the punch 41 varies along the circumference of the cylindrical portion 43. As a result, the cylindrical portion 43 is sequentially pushed outward in the radial direction all along the circumference thereof. When the main spindle 38 is displaced downward in the vertical direction while being pivoted around the head axis 36, the cylindrical portion 43 is plastically deformed outward in the radial direction to form the clinched portion 27. The shape of the clinched portion 27 is depicted by a dashed line in FIG. 4. The clinched portion 27 is pressed against the large end surface 33 of the inner ring member 18, which prevents the inner ring member 18 from slipping out from the hub shaft 17.

With reference to FIG. 4, a load imposed on the main spindle 38 during clinching will be described. As depicted in FIG. 4, the upper end of the main spindle 38 in the vertical direction is inclined rightward in the figure. Thus, the clinching portion 52 of the punch 41 and the cylindrical portion 43 approach each other in the right of the figure with respect to the hub axis 37.

Such a load F as depicted in FIG. 4 acts on a point where the clinching portion 52 contacts the cylindrical portion 43. The load F is a load acting generally upward in the vertical direction and imposed on the punch 41 at a point away from the main spindle axis 42 in the radial direction. Thus, a bending moment M acts in the counterclockwise direction on the punch holder 40 supporting the punch 41. The action of the bending moment M causes the portions of the main spindle 38 to be elastically deformed to generate stress in outer peripheral surfaces of the spindle portion 39 and the punch holder 40. In FIG. 4, compressive stress is generated at the continuous portion X1 located at a position A close to the point where the punch 41 contacts the cylindrical portion 43. Tensile stress is generated at the continuous portion X1 located at a position B farthest from the contact point.

When the main spindle 38 pivots around the head axis 36 by 180°, the main spindle axis 42 is displaced to a position where the main spindle axis 42 are symmetric about the head axis 36. That is, the main spindle 38 rotates around the main spindle axis 42 inclined leftward at the angle θ to the head axis 36. In this case, the punch 41 contacts the cylindrical portion 43 in left of FIG. 4 with respect to the hub axis 37 (not depicted in the drawings). At this time, tensile stress is generated at the continuous portion X1 located at the position A, and compressive stress is generated at the continuous portion X1 located at the position B. In this manner, the pivoting of the main spindle 38 results in repeated action of the compressive stress and the tensile stress on the continuous portion X1 As a result, the main spindle is fatigued and broken at the continuous portion X1.

Figure 3:
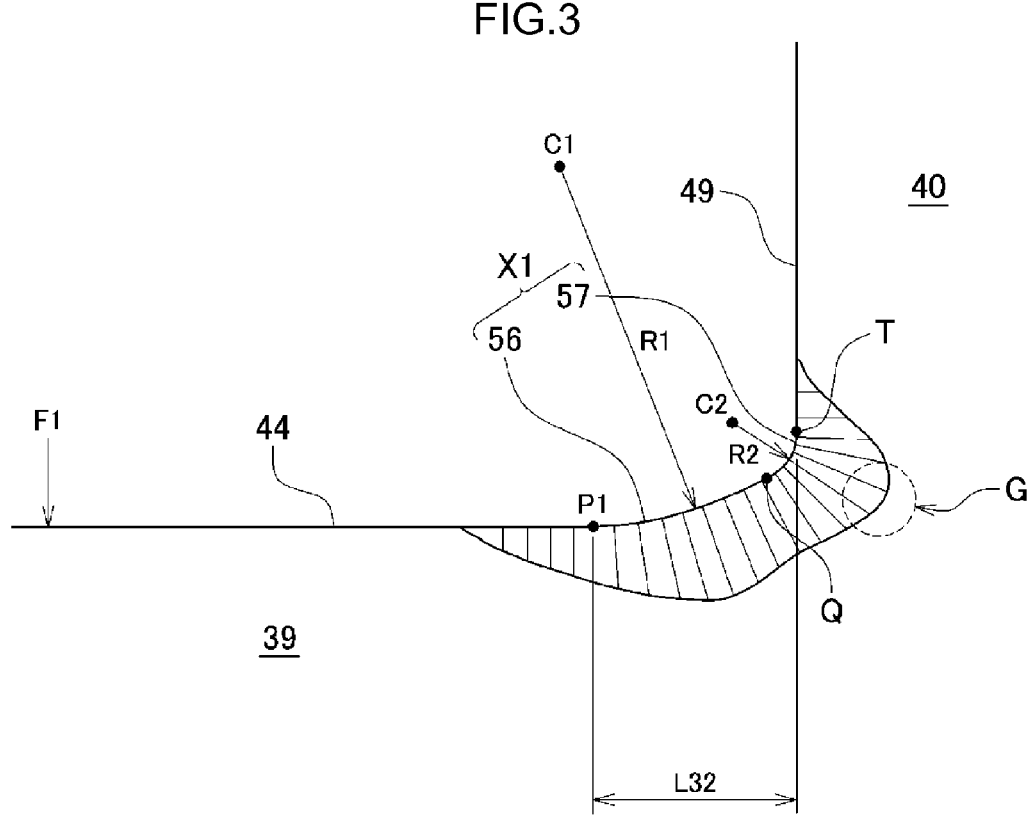
FIG. 3 is a diagram illustrating distribution of stress occurring at a continuous portion in the first embodiment of the present invention.

Using FIG. 3, stress will be described which is generated at the continuous portion X1 during clinching FIG. 3 is an axial sectional view of the main spindle 38 and an enlarged view of a main part of the main spindle 38 in the vicinity of the continuous portion X1. FIG. 3 also depicts distribution of stress occurring in the surface of the main spindle 38. The length of a line extending in a normal direction from points on an outer periphery of the main spindle 38 represents the magnitude of the stress at the points. The stress distribution indicates the results of calculations based on a finite element method (FEM). The fatigue strength of the material is significantly impacted by the tensile stress. Thus, FIG. 4 illustrates the stress generated at the continuous portion X1 at the position B.

When stress values were calculated, the curvature radius R1 of the first circular arc 56 was set to 50 mm, and the curvature radius R2 of the second circular arc 57 was set to 5 mm. In this case, the axial dimension L32 between the point P1 and the side surface 49 is approximately 20 mm. The dimensions of the relevant portions used for the calculation of the stress are as follows: the diameter dimension of the spindle portion 39: 50 mm, the outside diameter dimension of the punch holder 40: 80 mm, the axial thickness of the punch holder 40: 20 mm, the outside diameter dimension of the cylindrical portion 43: 60 mm, and the bore diameter dimension of the cylindrical portion 43: 47 mm. A Young's modulus for the main spindle 38 and the cylindrical portion 43 is 208 GPa.

In the first embodiment, the level of the tensile stress generated at the continuous portion X1 is substantially uniform in the axial direction, and does not concentrate at any particular area. Therefore, the maximum value of the stress generated at the continuous portion X1 can be reduced to an acceptable level compared to the fatigue strength of the material. The stress generated on each of the first and second circular arcs 56 and 57 constituting the continuous portion X1 will be described in detail.

The stress generated at the portion corresponding to the first circular arc 56 will be described. In the main spindle 38 of the first embodiment, the bending moment M acts on the punch holder 40 at the spindle end. The bending moment M is supported by the needle roller bearings 45a and 45b. In this support form, the bending moment at the spindle portion 39 acting on the continuous portion X1 increases toward the side surface 49. In the first embodiment, the first circular arc 56 is provided, and thus, the diameter dimension of the spindle portion 39 increases toward the side surface 49 and a section modulus of the spindle portion 39 increases toward the side surface 49. Thus, at the portion corresponding to the first circular arc 56, the section modulus of the spindle portion 39 can be increased toward the side surface 49 consistently with the bending moment. Consequently, it is possible to suppress an increase in the stress generated on the first circular arc 56.

On the other hand, providing the first circular arc 56 changes the surface shape of the spindle portion 39 in the axial direction. This increases a shape factor for the spindle portion 39. The shape factor is a value obtained by dividing the maximum stress resulting from stress concentration by a nominal stress. The degree of stress concentration increases consistently with the value of the shape factor. However, in the first embodiment, the first circular arc 56 has a large curvature radius R1 such that the surface shape changes gradually, which allows to suppress an increase in shape factor. As a result, it is possible to reduce stress concentration on the first circular arc 56. To allow the surface shape of the first circular arc 56 to change gradually to suppress an increase in shape factor, it is optimum to set the curvature radius R1 of the first circular arc 56 to a value that is 50 to 200% of the diameter dimension of the spindle portion 39.

Next, the stress generated at the portion corresponding to the second circular arc 57 will be described. In the first embodiment, the curvature radius R2 of the second circular arc 57 is smaller than the curvature radius R1 of the first circular arc 56. Thus, a relatively high stress is generated on the second circular arc 57 due to stress concentration (in a stress area G depicted in FIG. 3). The high stress generated on the second circular arc 57 causes the stress generated on the first circular arc 56 to be distributed. As a result, the stress generated on the first circular arc 56 generally decreases.

On the other hand, the distribution of the stress on the first circular arc 56 causes an increase in the stress on the second circular arc 57. The outside diameter dimension of the spindle portion 39 increases toward the side surface 49. Thus, at a portion of the second circular arc 57 joined to the side surface 49, where the spindle portion 39 has a large diameter dimension, the stress caused by the bending moment M is small. Consequently, even if the stress on the second circular arc 57 increases, the increase is not so high as to pose a problem to the material strength.

When a high stress is generated on the second circular arc 57, it is significant to distribute the stress generated on the first circular arc 56 to reduce the maximum value of the stress generated at the continuous portion X1. Thus, the curvature radius R2 of the second circular arc 57 needs to be smaller than the curvature radius R1 of the first circular arc 56. It is optimum that the curvature radius R2 of the second circular arc 57 preferably has a value that is 5 to 50% of the curvature radius R1 of the first circular arc 56.

The first circular arc 56 and the second circular arc 57 contact each other. At the point Q, the gradient of a tangent to the first circular arc 56 is equal to the gradient of a tangent to the second circular arc 57. Therefore, at the point Q, the shape of the continuous portion X1 changes smoothly from the first circular arc 56 to the second circular arc 57. Thus, at the point Q, an increase in the shape factor for the continuous portion X1 can be suppressed, which allows suppressing an increase in stress.

As described above, in the first embodiment, the stress generated on the second circular arc 57 is increased to allow distribution of the stress generated at the portion corresponding to the first circular arc 56. As a result, the stress generated on the first circular arc 56 can be reduced. Thus, the maximum value of the stress generated at the continuous portion X1 can be reduced to an acceptable level compared to the fatigue strength of the material. Consequently, it is possible to avoid premature breakage of the main spindle 38.

Figure 5:
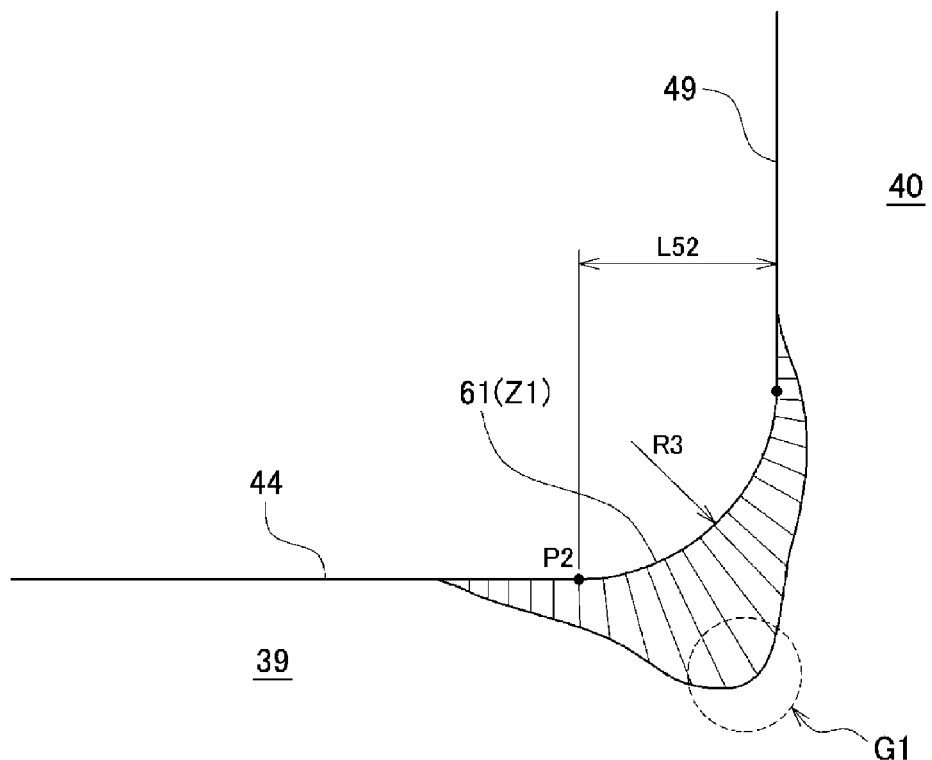
FIG. 5 is a diagram illustrating distribution of stress occurring at a continuous portion in Comparative Example 1.
Figure 6:
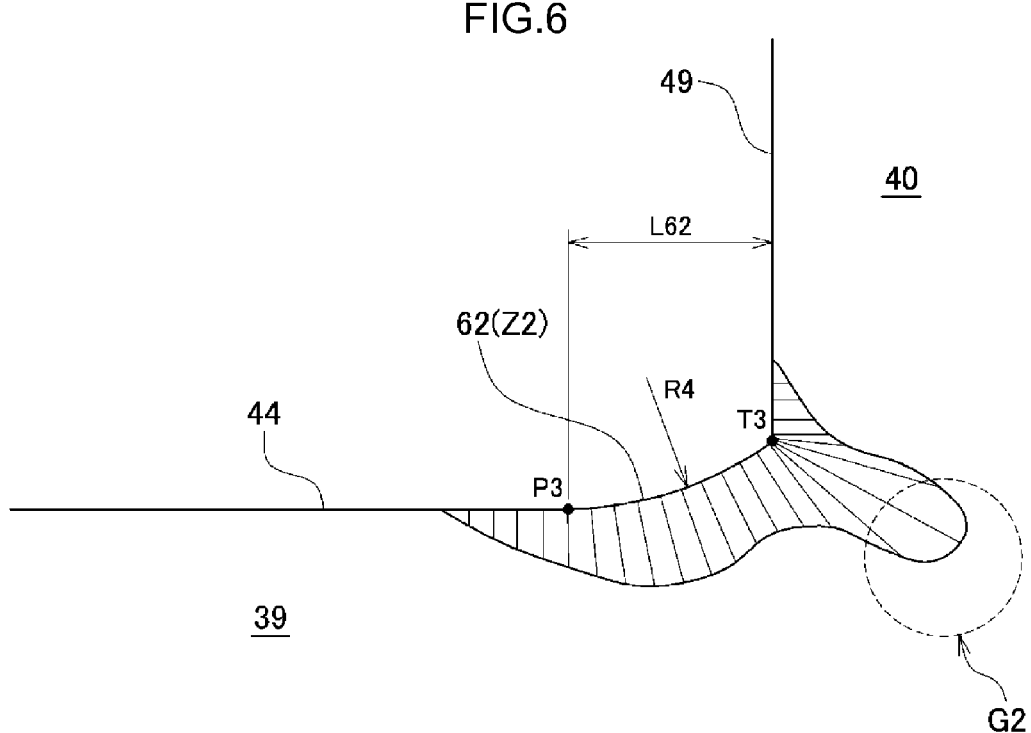
FIG. 6 is a diagram illustrating distribution of stress occurring at a continuous portion in Comparative Example 2.

FIG. 5 and FIG. 6 each depict distribution of stress that occurs at a "continuous portion" for another shape so that the effect of the present invention is described. FIG. 5 depicts distribution of stress occurring at a "continuous portion" in Comparative Example 1 (hereinafter referred to as a continuous portion Z1). FIG. 6 depicts a stress distribution occurring at a "continuous portion" in Comparative Example 2 (hereinafter referred to as a continuous portion Z2). FIG. 5 and FIG. 6 are axial sectional views of the continuous portion Z1 and the continuous portion Z2, respectively. The shapes of the spindle portion 39 and the punch holder 40 in Comparative Example 1 and Comparative Example 2 are the same as the shapes of the spindle portion 39 and the punch holder 40 in the first embodiment except for the continuous portion Z1 and the continuous portion Z2. Thus, only the continuous portion Z1 and the continuous portion Z2 are denoted by new reference numerals. The spindle portion 39 and the punch holder 40 are denoted by the same reference numerals as those in the first embodiment.

In Comparative Example 1 depicted in FIG. 5, the continuous portion Z1 is formed of a single circular arc 61 with a curvature radius R3. The circular arc 61 joins the outer peripheral surface 44 and the side surface 49 together. The curvature radius R3 of the circular arc 61 is 20 mm, which is equal to 40% of the diameter dimension of the spindle portion 39. To allow a comparison between the stress generated at the continuous portion Z1 and the stress generated at the continuous portion X1 in the first embodiment, the sizes of the areas forming the "continuous portions" were set equivalent to one another. Specifically, an axial dimension L52 between a point P2 and the side surface 49 was set equal to the axial dimension L32 between the point P1 and the side surface 49 in the first embodiment. The point P2 is a point where the circular arc 61 crosses the outer peripheral surface 44.

In Comparative Example 1, the stress is higher in an area at a distance of approximately one-third of L52 from the point P2 toward the side surface 49 in the axial direction (a stress area G1 depicted in FIG. 5). As a result, the maximum value of the stress generated at the continuous portion Z1 may exceed the fatigue strength of the material. This is because the curvature radius R3 (20 mm) of the circular arc 61 in Comparative Example 1 is smaller than the curvature radius R1 (50 mm) of the first circular arc 56 in the first embodiment, which results in a significant change in axial shape and thus an increase in the shape factor for the spindle portion 39.

Compared to the stress distribution in Comparative Example 1, the distribution of stress occurring at the continuous portion X1 in the first embodiment is substantially uniform in the axial direction and involves no stress concentration at a particular area. Thus, the first embodiment enables the maximum value of the stress generated at the continuous portion X1 to be reduced to an acceptable level compared to the fatigue strength of the material. Consequently, it is possible to avoid premature breakage of the main spindle 38.

In Comparative Example 2 illustrated in FIG. 6, the continuous portion Z2 is formed of a single circular arc 62. The curvature radius R4 of the circular arc 62 is as large as the curvature radius R1 of the first circular arc 56 in the first embodiment (50 mm). A point where the circular arc 62 crosses the outer peripheral surface 44 is represented as a point P3. A point where the circular arc 62 crosses the side surface 49 is represented as a point T3. To allow a comparison between the stress generated at the continuous portion Z2 and the stress generated at the continuous portion X1 in the first embodiment, the sizes of the areas forming the "continuous portions" were set equivalent to one another. Specifically, an axial dimension L62 between the point P3 and the side surface 49 was set equal to the axial dimension L32 between the point P1 and the side surface 49 in the first embodiment.

In Comparative Example 2, distribution of stress generated on the circular arc 62 is substantially uniform in the axial direction. In Comparative Example 2, the circular arc 62 continuous with the outer peripheral surface 44 has a large curvature radius R4 to make the surface shape change gradually as is the case with the first embodiment. This can suppress an increase in shape factor to reduce stress concentration on the first circular arc 56. However, a portion joining the circular arc 62 and the side surface 49 together has a very large curvature, which causes a high stress near the point T3 (a stress area G2 depicted in FIG. 6). Accordingly, the maximum value of the stress generated at the continuous portion Z2 exceeds the fatigue strength of the material, and thus premature breakage of the main spindle 38 cannot be avoided.

Compared to Comparative Example 2, the first embodiment involves no significant stress concentration at the second circular arc 57 in the first embodiment. As a result, the stress generated at the continuous portion X1 is substantially uniform in the axial direction, and the maximum value of the stress generated at the continuous portion X1 can be reduced to an acceptable level compared to the fatigue strength of the material. In the first embodiment, the curvature radius of the second circular arc 57 is 5% or more of the first circular arc 56.

Figure 7:
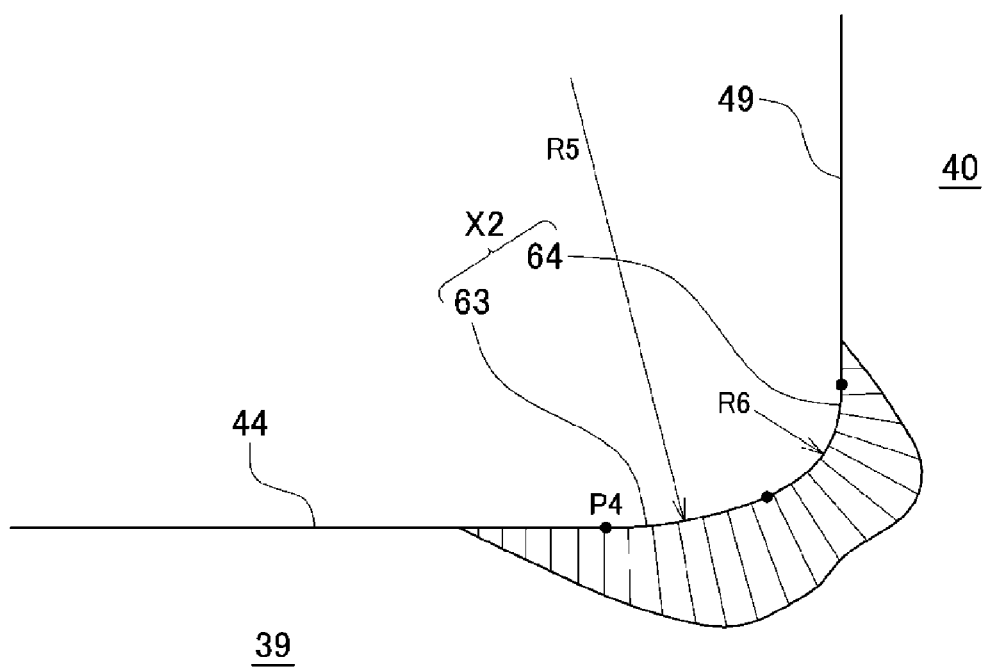
FIG. 7 is a diagram illustrating distribution of stress occurring at a continuous portion in a second embodiment of the present invention.
Figure 8:
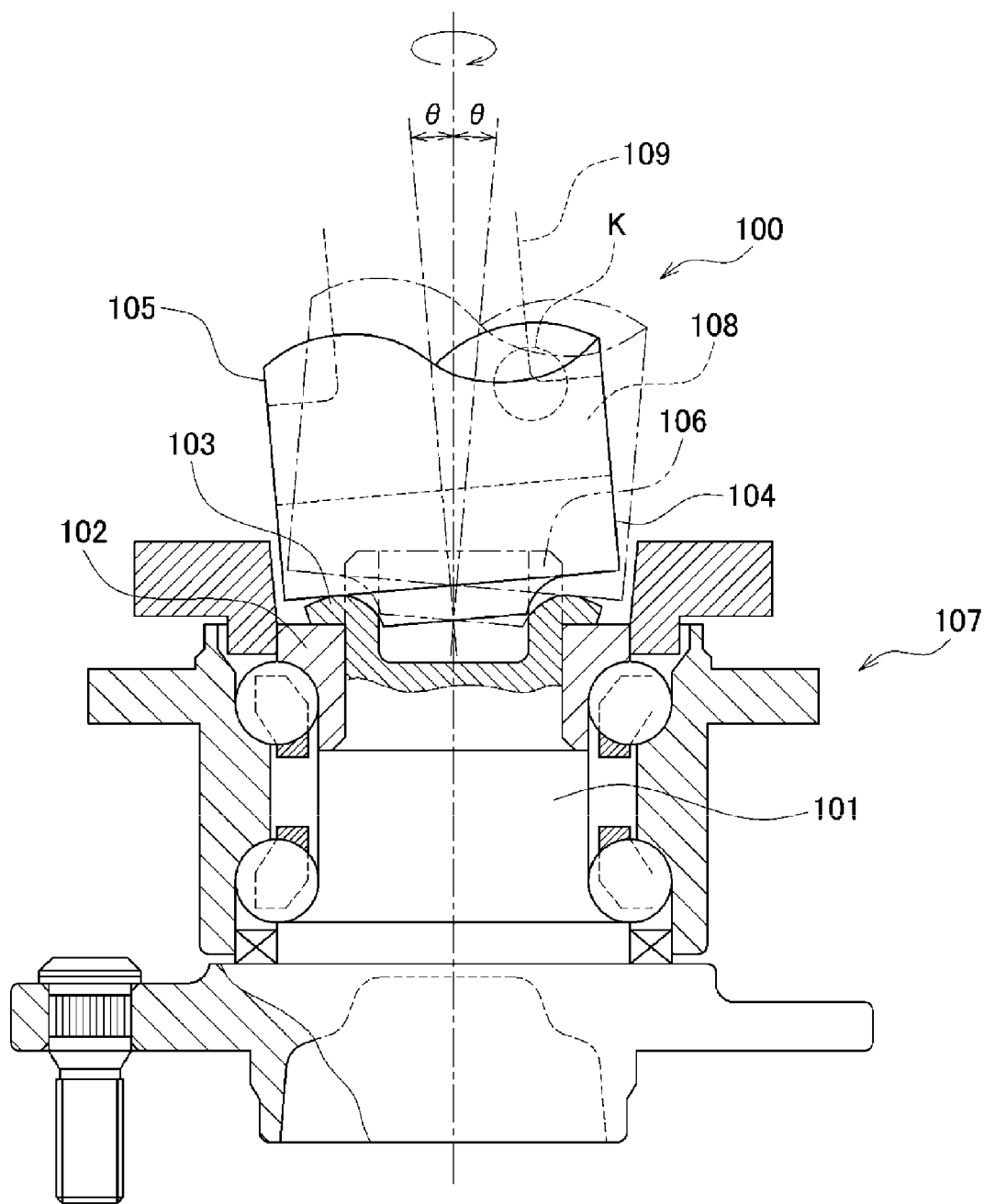
FIG. 8 is a sectional view illustrating a conventional hub unit manufacturing apparatus.

FIG. 7 depicts the stress distribution of a continuous portion X2 in a second embodiment of the present invention. FIG. 7 is an axial sectional view of the continuous portion X2 in the second embodiment. The continuous portion X2 in the second embodiment is different from the continuous portion X1 in the first embodiment only in the size of the curvature radius of the second circular arc. A curvature radius R6 of a second circular arc 64 in the second embodiment is 20 mm. A curvature radius R5 of a first circular arc 63 in the second embodiment is 50 mm. The size of the curvature radius R6 is 40% of the size of the curvature radius R5.

In the second embodiment, a high stress is generated at a portion corresponding to the second circular arc 64. As a result, stress generated at the portion corresponding to the first circular arc 63 is distributed to enable the maximum value of stress generated at the continuous portion X2 to be reduced to an acceptable level compared to the fatigue strength of the material.

However, the stress generated at the portion corresponding to the first circular arc 63 is slightly higher than the stress in the first embodiment. This is because the curvature radius of the second circular arc 64, which is larger than the curvature radius of the second circular arc 57 in the first embodiment, serves to reduce the stress generated at the portion corresponding to the second circular arc 64, and thus the effect of distributing the stress generated on the first circular arc 63 is reduced.

Therefore, to distribute the stress on the first circular arc 63, it is appropriate to set the curvature radius R6 of the second circular arc 64 to 40% or less of the curvature radius R1 of the first circular arc 56.

As described above, the hub unit manufacturing apparatus using the present invention causes a high stress on the second circular arc to allow the stress generated on the first circular arc to be distributed. As a result, the maximum value of the stress generated at the "continuous portion" can be reduced to an acceptable level compared to the fatigue strength of the material, which allows avoiding premature breakage of the main spindle. Therefore, for a hub unit manufacturing apparatus used in a process of clinching a shaft end of a hub shaft, the use of the present invention allows avoiding premature breakage of a main spindle that has, at a spindle end thereof, a punch holder having a diameter larger than the diameter of a spindle portion, and providing the hub unit manufacturing apparatus with improved durability.

For a hub unit manufacturing apparatus used in a process of clinching a shaft end of a hub shaft, the present invention allows avoiding premature breakage of a main spindle that has, at a spindle end thereof, a punch holder having a diameter larger than the diameter of a spindle portion, and providing the hub unit manufacturing apparatus with improved durability.

What is claimed is:

1. A hub unit manufacturing apparatus that, after an inner ring member is installed in a hub shaft of a hub unit, causes a punch to contact with a shaft end portion of the hub shaft to push and expand the shaft end portion while plastically deforming the shaft end portion so that the inner ring member is constrained by the hub shaft, the hub unit manufacturing apparatus comprising:
   a main spindle in which the punch is installed and which has:
   a cylindrical spindle portion; and
   a punch holder formed integrally with the spindle portion and having a larger diameter than the spindle portion, wherein
   an axial section of a continuous portion where an outer peripheral surface of the spindle portion is joined to an outer peripheral surface of the punch holder is formed of a first circular arc joined to the outer peripheral surface of the spindle portion and a second circular arc joined to the outer peripheral surface of the punch holder,
   the first circular arc and the second circular arc are in contact with each other, and
   the second circular arc is smaller than the first circular arc in curvature radius.

2. The hub unit manufacturing apparatus according to claim 1, wherein
   the curvature radius of the first circular arc is 50%-200% of a diameter of the spindle portion.

3. The hub unit manufacturing apparatus according to claim 1, wherein
   the curvature radius of the second circular arc is 5%-40% of the curvature radius of the first circular arc.

* * * * *